(12) United States Patent
Kanaya et al.

(10) Patent No.: US 8,576,462 B2
(45) Date of Patent: Nov. 5, 2013

(54) IMAGE READING APPARATUS AND IMAGE READING SYSTEM

(75) Inventors: Shingo Kanaya, Ishikawa (JP); Kiyoto Kosaka, Ishikawa (JP)

(73) Assignee: PFU Limited, Ishikawa (JP)

( * ) Notice: Subject to any disclaimer, the term of this patent is extended or adjusted under 35 U.S.C. 154(b) by 387 days.

(21) Appl. No.: 12/821,567

(22) Filed: Jun. 23, 2010

(65) Prior Publication Data

US 2011/0176186 A1    Jul. 21, 2011

(30) Foreign Application Priority Data

Jan. 15, 2010 (JP) ................. 2010-007358

(51) Int. Cl.
*H04N 1/04* (2006.01)
(52) U.S. Cl.
USPC ............................ 358/498; 358/474; 358/520
(58) Field of Classification Search
USPC .......... 358/498, 474, 475, 509, 449, 520, 496
See application file for complete search history.

(56) References Cited

U.S. PATENT DOCUMENTS

| | | | | |
|---|---|---|---|---|
| 5,119,213 A | * | 6/1992 | Graves et al. | 358/488 |
| 5,146,087 A | * | 9/1992 | VanDusen | 399/2 |
| 5,339,139 A | * | 8/1994 | Fullerton et al. | 399/203 |
| 5,513,017 A | * | 4/1996 | Knodt et al. | 358/471 |
| 6,233,063 B1 | * | 5/2001 | Bernasconi et al. | 358/474 |
| 6,252,684 B1 | * | 6/2001 | Lin | 358/498 |
| 8,233,201 B2 | | 7/2012 | Toyoda | |
| 8,319,749 B2 | | 11/2012 | Harada et al. | |
| 2003/0178585 A1 | * | 9/2003 | Tseng | 250/559.24 |

FOREIGN PATENT DOCUMENTS

| | | |
|---|---|---|
| CN | 101542422 A | 9/2009 |
| CN | 200910151239.8 A | 1/2010 |
| JP | 8-30044 A | 2/1996 |
| JP | 09-065061 A | 3/1997 |
| JP | 11-41416 A | 2/1999 |
| JP | 11-112735 A | 4/1999 |
| JP | 2005-057483 A | 3/2005 |
| JP | 2009-124481 A | 4/2009 |

OTHER PUBLICATIONS

Office action issued in Chinese Patent Application No. 201010215911.8 dated Mar. 5, 2013.
Japanese Office Action issued in 2010-007358, dated Mar. 19, 2013.

* cited by examiner

*Primary Examiner* — Negussie Worku
(74) *Attorney, Agent, or Firm* — Lowe, Hauptman & Ham (57) ABSTRACT

An apparatus includes: a light source opposite to one surface of a medium; a backing member opposite to another surface of the medium and including a backing surface opposite to the another surface of the medium; an imaging unit opposite to the one surface of the medium and at a position different from the light source in a conveyance direction, and to pick up an image of the medium and the backing surface on which a shadow of the medium is formed due to light from the light source; and a processor to generate image data including the image of the medium and the backing surface based on a result by the imaging unit, wherein the backing surface is inclined with respect to the conveyance direction, and a gap between the path and the backing surface decreases from a light source side toward an imaging unit side.

8 Claims, 6 Drawing Sheets

UPSTREAM SIDE ⟵ CONVEYANCE DIRECTION ⟶ DOWNSTREAM SIDE

PRIOR ART

IMAGE READING APPARATUS AND IMAGE READING SYSTEM

CROSS-REFERENCE TO RELATED APPLICATIONS

This application is based upon and claims the benefit of priority from Japanese Patent Application No. 2010-007358, filed on Jan. 15, 2010, the entire contents of which are incorporated herein by reference.

BACKGROUND OF THE INVENTION

1. Field of the Invention

The present invention relates to an image reading apparatus and an image reading system.

2. Description of the Related Art

Conventionally, for image reading apparatuses and the like, a technique for detecting edges of sheet-like media has been proposed. Detection of edges enables, for example, detection of a size of a medium.

As a technique for detecting the edges, for example, Japanese Laid-open Patent Publication No. 09-65061 discloses a technique of detecting skewing of an original by providing a reflecting surface having a same reflectivity as that of an original as a background of an original reading portion and detecting a shadow of the original formed on the reflecting surface.

However, when edges of a sheet-like medium are to be detected according to a shadow of the medium, light and shade of the shadow of the medium vary according to the thickness of the medium for example, and accuracy of the detection of edges can decrease according to the thickness or kind of the medium to be detected.

SUMMARY OF THE INVENTION

It is an object of the present invention to at least partially solve the problems in the conventional technology.

According to an aspect of the present invention, an image reading apparatus is configured to read an image on a sheet-like medium conveyed on a conveyance path by an automatic conveying device. The image reading apparatus includes: a light source arranged opposite to one surface of the medium; a backing member arranged opposite to another surface of the medium and including a backing surface arranged opposite to the another surface of the medium; an imaging unit arranged opposite to the one surface of the medium and at a position different from the light source in a conveyance direction of the medium, and configured to pick up an image of the medium and the backing surface on which a shadow of the medium is formed due to light from the light source; and an image processor configured to generate image data including the image of the medium and the backing surface based on an image pick-up result by the imaging unit, wherein the backing surface is inclined with respect to the conveyance direction, and a gap between the conveyance path and the backing surface decreases from a light source side toward an imaging unit side in the conveyance direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an image reading apparatus according to the present invention will be explained below in detail with reference to the accompanying drawings. The present invention is not limited to the embodiment. In addition, structural elements in the following embodiment include elements easily assumed by those skilled in the art, or elements that are substantially the same.

Figure 1:
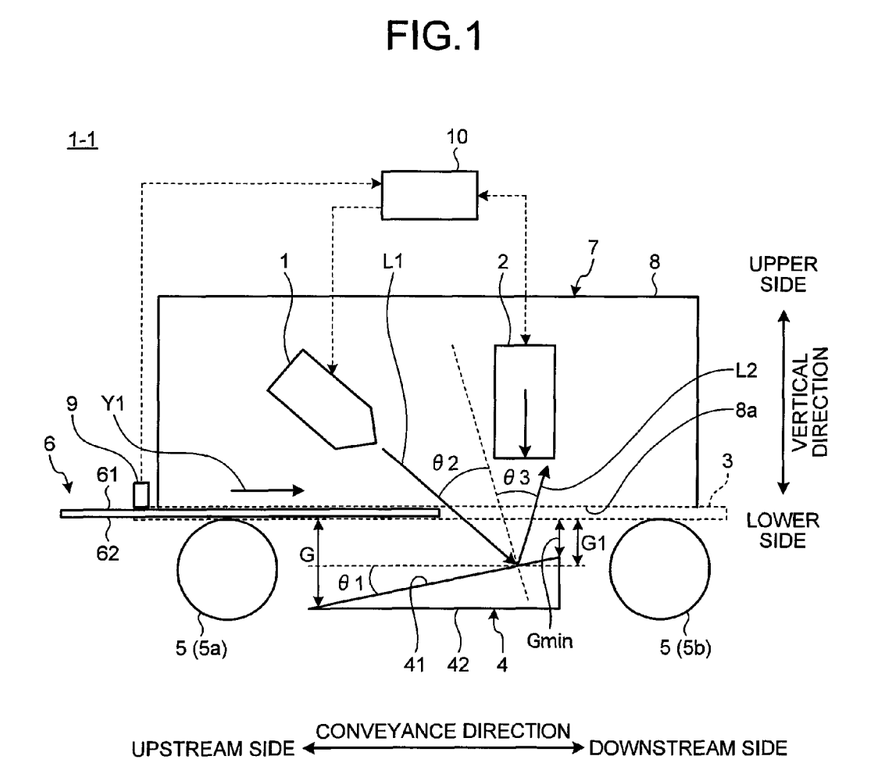
FIG. 1 is a sectional view of a schematic configuration of an image reading apparatus according to an embodiment of the present invention.
Figure 2:
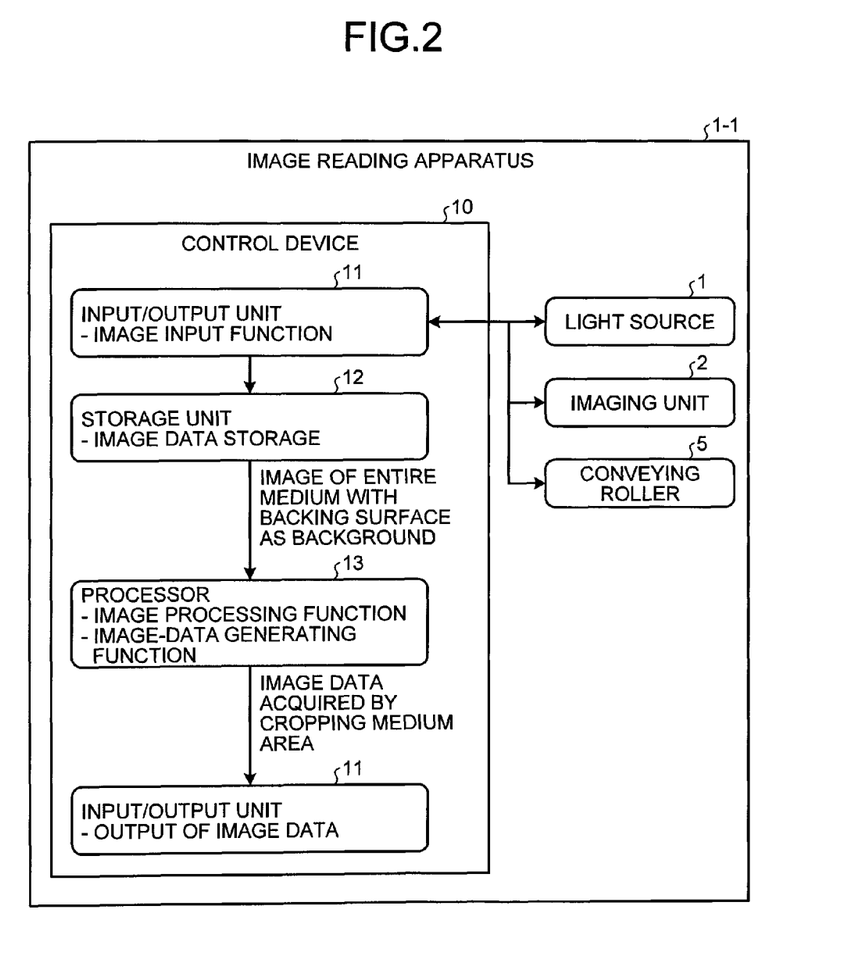
FIG. 2 is a block diagram of the image reading apparatus according to the embodiment.

An embodiment of the present invention is explained with reference to FIGS. 1 to 8. This embodiment relates to an image reading apparatus that detects edges of a sheet-like medium conveyed by an automatic conveying device. The sheet-like medium is a sheet-like object to be read such as an original or a business card. FIG. 1 is a sectional view of a schematic structure of the image reading apparatus according to the embodiment of the present invention, and FIG. 2 is a block diagram of the image reading apparatus according to the embodiment. A cross section orthogonal to a main scanning direction is depicted in FIG. 1.

An image reading apparatus 1-1 depicted in FIG. 1 according to the present embodiment is an image reading apparatus that reads an image on the sheet-like medium 6 conveyed on a conveyance path 3 by the automatic conveying device. The image reading apparatus 1-1 includes a light source 1 arranged opposite to one surface of the medium 6, a backing member 4 arranged opposite to the other surface of the medium 6 and including a backing surface 41 facing the other surface of the medium 6, an imaging unit 2 facing the one surface of the medium 6 and arranged at a different position from the light source 1 in a conveyance direction of the medium 6 to pick up an image of the medium 6 and the backing surface 41 on which a shadow of the medium 6 is formed due to light from the light source 1, and an image processor that generates image data including the medium 6 and the backing surface 41 based on an image pick-up result acquired by the imaging unit 2. The backing surface 41 is inclined with respect to the conveyance direction, and a gap "G" between the conveyance path 3 and the backing surface 41 decreases from the light source 1 side toward the imaging unit 2 side in the conveyance direction. Accordingly, it is possible to form a shadow sufficient for detecting the edges of the medium 6 on the backing surface 41, and to improve accuracy of detection of the medium 6.

The image reading apparatus 1-1 according to the embodiment includes, as depicted in FIG. 1, an optical unit (an image reading unit) 7, a conveying roller (an automatic conveying device) 5, and the backing member 4. The image reading apparatus 1-1 reads an image on the sheet-like medium 6 conveyed on the conveyance path 3 by the conveying roller 5, to generate image data. The optical unit 7 includes a housing 8, the light source 1, and the imaging unit 2. The housing 8 is hollow and the light source 1 and the imaging unit 2 are arranged inside the housing 8. In the present embodiment, an example in which the optical unit 7 is an equal-magnification optical system is explained, but the optical unit 7 is not limited thereto and may be a minification optical system.

The optical unit 7 and the backing member 4 are arranged with the medium 6 to be conveyed between them. The optical unit 7 is arranged on one side of the medium 6, and the backing member 4 is arranged on the other side of the medium 6. That is, the optical unit 7 is arranged on one side of the medium 6, and the backing member 4 is arranged on the other side of the medium 6 in a direction orthogonal to the medium 6. In the following explanation, an example in which the medium 6 is conveyed horizontally, the optical unit 7 is arranged on an upper side of the medium 6 in a vertical direction, and the backing member 4 is arranged on a lower side of the medium 6 in the vertical direction is explained; however, the present invention is not limited thereto. The conveyance direction of the medium 6 is not limited to the horizontal direction, as long as the optical unit 7 and the backing member 4 are arranged to be divided to one side and the other side with the medium 6 therebetween.

The housing 8 of the optical unit 7 includes a transmission surface 8a formed of a glass or the like, through which light is transmitted. The transmission surface 8a is arranged between the medium 6 and the light source 1 plus the imaging unit 2, faces one surface of the medium 6 (a surface on the light source 1 side) and is a conveyance-path constituting member constituting the conveyance path 3. The light source 1 and the imaging unit 2 are arranged opposite to the transmission surface 8a, and face one surface of the medium 6 to be conveyed (an upper surface 61), with the transmission surface 8a therebetween. The light source 1 and the imaging unit 2 are arranged at different positions in the conveyance direction, and the light source 1 is positioned on an upstream side of the imaging unit 2 in the conveyance direction. The transmission surface 8a constitutes the conveyance path 3 for the medium 6. The conveyance path 3 is a passage of the medium 6 to be conveyed by the conveying roller 5. The transmission surface 8a functions as an upper surface of the conveyance path 3, and the medium 6 is conveyed on the conveyance path 3 extending in the conveyance direction along the transmission surface 8a. The conveying roller 5 is arranged opposite to the transmission surface 8a. The conveying roller 5 according to the present embodiment includes an upstream-side conveying roller 5a arranged on the upstream side in the conveyance direction of the medium 6 and a downstream-side conveying roller 5b arranged on a downstream side in the conveyance direction of the medium 6. The conveyance path 3 is formed between the transmission surface 8a and the conveying roller 5, and the medium 6 between the conveying roller 5 and the transmission surface 8a is conveyed toward the downstream side, forward in the conveyance direction (see an arrow Y1) by the rotating conveying roller 5.

The backing member 4 is arranged opposite to a lower surface 62 of the medium 6 at a position between the upstream-side conveying roller 5a and the downstream-side conveying roller 5b. The backing member 4 includes the backing surface 41 facing the medium 6 to be conveyed, and having a triangular cross-section in a direction orthogonal to an axial direction of the conveying roller 5. The backing surface 41 is a plane facing upward in the vertical direction, and faces the lower surface 62 of the medium 6. A lower surface 42 of the backing member 4 is a surface parallel to the conveyance path 3. In the image reading apparatus 1-1, a maximum width in the main scanning direction of the medium 6 that is conveyable is set, and the width of the backing surface 41 in the main scanning direction is larger than this maximum width. The backing surface 41 is inclined with respect to the conveyance direction. The gap "G" between the conveyance path 3 and the backing surface 41 (a gap between the conveyance path 3 and the backing surface 41 in the direction orthogonal to the medium 6) decreases from the light source 1 side toward the imaging unit 2 side in the conveyance direction. In the present embodiment, the light source 1 is arranged on the upstream side of the imaging unit 2 in the conveyance direction. Correspondingly thereto, the gap "G" between the conveyance path 3 and the backing surface 41 decreases from the upstream side toward the downstream side in the conveyance direction. When the light source 1 is arranged on the downstream side of the imaging unit 2 in the conveyance direction, the gap "G" between the conveyance path 3 and the backing surface 41 may be made to decrease from the downstream side toward the upstream side in the conveyance direction. Reference character "G1" denotes the gap "G" between the conveyance path 3 and the backing surface 41 at an image-pick-up target position (a read line) of the imaging unit 2. The read line of the imaging unit 2 is positioned upstream of a downstream end of the backing surface 41 in the conveyance direction.

The backing member 4 is arranged at a position spaced from the conveyance path 3. A minimum value of the gap between the backing member 4 and the conveyance path 3 is a gap "Gmin" at a downstream end in the conveyance direction (hereinafter, "the minimum gap "Gmin""), in the gap "G" between the conveyance path 3 and the backing surface 41. The minimum gap "Gmin" is preferably a value larger than 0. The minimum gap "Gmin" may be set to, for example, 0.2 millimeter or more, for securing the conveyance path 3 of the medium 6. The gap "G1" between the conveyance path 3 and the backing surface 41 at the image-pick-up target position of the imaging unit 2 may be determined based, for example, on a width of the shadow of the medium 6 formed on the backing surface 41. The gap "G1" between the conveyance path 3 and the backing surface 41 at the image-pick-up target position of the imaging unit 2 is preferably set to be in a range of, for example, equal to or larger than 0.8 millimeter and equal to or less than 2.0 millimeters, and may be set to 1.6 millimeters, for example.

Reference character θ1 denotes an angle formed between the conveyance direction and the backing surface 41, and an inclination angle of the backing surface 41 with respect to the conveyance direction (hereinafter, "inclination angle of the backing surface 41"). Reference characters θ2 and θ3 respectively denote an incident angle and a reflection angle of light on the backing surface 41. The inclination angle θ1 of the backing surface 41 is an acute angle (0°<θ1<90°), and it is preferably an angle in a range of, for example, larger than 0 and equal to or less than 20 degrees. For example, the range of the inclination angle θ1 of the backing surface 41 is preferably set such that a contrast between appearances of the medium 6 and the backing surface 41 (densities in the image data picked up by the imaging unit 2) does not become excessively large.

The light source 1 is arranged opposite to the upper surface 61 of the medium 6 to be conveyed, to irradiate light to the medium 6 and the backing surface 41. The light source 1 irradiates light from the upstream side in the conveyance direction toward the medium 6 and the backing surface 41, and light irradiated from the light source 1 includes at least light directed to the downstream side in the conveyance direction (see reference character L1) and downward in the vertical direction (the direction toward the backing surface 41). The imaging unit 2 picks up an image of the medium 6 and the backing surface 41 irradiated with light by the light source 1. The imaging unit 2 includes a plurality of imaging elements arranged in the main scanning direction orthogonal to the conveyance direction (the axial direction of the conveying roller 5). In the main scanning direction, the imaging elements are arranged with the same width as that of a scanning range by the imaging unit 2. The imaging unit 2 scans the read line in the main scanning direction, and outputs an image pick-up result of the image-picked-up read line as image line data.

The image reading apparatus 1-1 includes a control device 10. As depicted in FIG. 2, the control device 10 includes an input/output unit 11, a storage unit 12, and a processor 13. The input/output unit 11, the storage unit 12, and the processor 13 are connected to each other so that reception and transmission of signals becomes possible. The input/output unit 11 has an image input function and an output function of image data. The storage unit 12 stores image data, a program for image processing, and the like. The processor 13 has an image processing function of processing image data, and a function of detecting edges of the medium 6 and generating image data of a medium area. The acquired image line data are stored in the storage unit 12. The control device 10 repeats the acquisition of image line data with respect to the medium 6 conveyed in the conveyance direction (a sub-scanning direction), to acquire image data (original image data) including the entire medium 6 with the backing surface 41 as a background.

The input/output unit 11 is connected to each of the light source 1, the imaging unit 2, and the conveying roller 5, and performs signal input and output from and to the light source 1, the imaging unit 2, and the conveying roller 5. The input/output unit 11 drives the light source 1 to irradiate light to the medium 6 conveyed and the backing surface 41. Further, the input/output unit 11 drives the imaging unit 2 to scan the read line, to acquire the image line data including the medium 6 and the backing surface 41. A shadow of the medium 6 is formed on the backing surface 41 due to the light from the light source 1. That is, the imaging unit 2 picks up the image of the medium 6 and the backing surface 41 on which the shadow of the medium 6 is formed due to the light from the light source 1. The processor 13 performs cut-out (cropping) of the medium area from the original image data, and acquires image data of the medium area. In the present embodiment, the control device 10 functions as an image processor that generates image data including the medium 6 and the backing surface 41 based on the image pick-up result by the imaging unit 2, and an edge detector that detects edges of the medium 6 in the image data.

Figure 3:
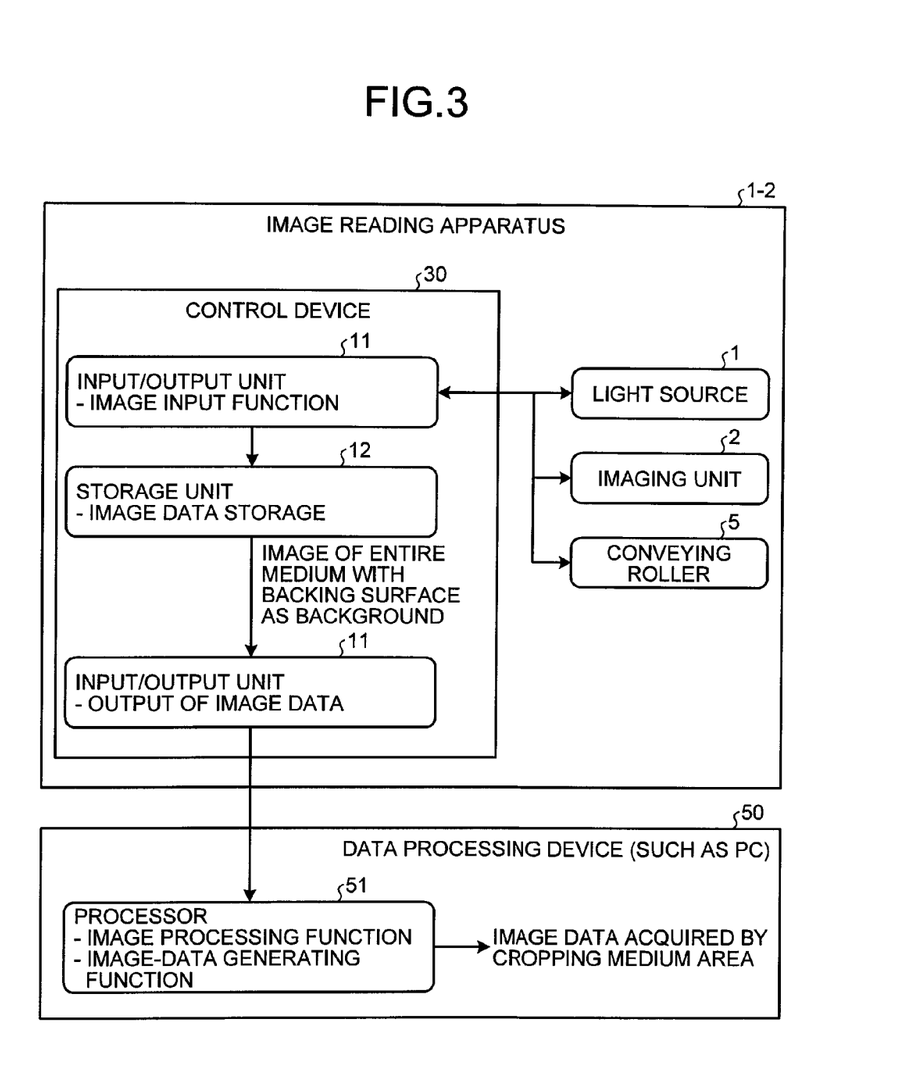
FIG. 3 is an example of an image reading system.

The edges may be detected by an external device. For example, a data processing unit (such as a PC), which is the external device, may be used as an edge detecting device that performs the same procedure as the edge detector. In this case, the edge detecting device performs transfer of image data with the image reading apparatus, and constitutes an image reading system together with the image reading apparatus. FIG. 3 is an example of the image reading system. The image reading system includes an image reading apparatus 1-2 and a data processing device 50. A control device 30 of the image reading apparatus 1-2 includes the input/output unit 11 and the storage unit 12, and the original image data are output from the storage unit 12 to a processor 51 in the data processing device 50 via the input/output unit 11. The processor 51 performs the cut-out (cropping) of the medium area from the original image data, similarly to the processor 13, to acquire image data of the medium area.

A detecting device 9 that detects whether the medium 6 exists is installed in the conveyance path 3 on the upstream side of the imaging unit 2 in the conveyance direction. As the detecting device 9, for example, a well known photo sensor, an ultrasonic (US) sensor, or a mechanical sensor may be used. The detecting device 9 detects whether there is the medium 6 at the installed position, and outputs a signal indicating a detection result to the control device 10. The detecting device 9 is provided, for example, at a position on the upstream side of the upstream-side conveying roller 5a in the conveyance direction. The control device 10 controls the light source 1, the imaging unit 2, and the conveying roller 5 based on the detection result of the detecting device 9. The control device 10 causes the imaging unit 2 to pick up an image of the read line from before the medium 6 to be conveyed reaches the read line until after the medium 6 has passed the read line. That is, the original image data acquired by the control device 10 includes an area forward of the front end of the medium 6 in the conveyance direction and an area rearward of a rear end of the medium 6 in the conveyance direction. In other words, the original image data includes an over-scanned area for size detection of the medium 6 at both the front and back ends of the medium 6. The control device 10 determines an imaging range in the conveyance direction for the imaging unit 2 based on the detection result of the detecting device 9. Imaging start timing and imaging end timing by the imaging unit 2 are determined, respectively, based on the detection result of the detecting device 9 and the conveying speed of the medium 6 by the conveying roller 5.

The scanning range of the imaging unit 2 in the main scanning direction is set larger than the maximum width of the medium 6 that is conveyable, which is a range covering an outside area of both ends of the medium 6. Therefore, in the image reading apparatus 1-1, the original image data including the entire medium 6 is generated with respect to the medium 6 of a size in an acceptable range. The detecting device 9 is preferably configured to detect the presence of the medium 6 at a plurality of positions in the main scanning direction, so that the medium 6 is detectable regardless of a set position of the medium 6 and a medium size. The detecting device 9 may be arranged not only on the upstream side of the imaging unit 2 in the conveyance direction but also on the downstream side.

Cropping of the medium area from the original image data is performed based on an edge detection result for the medium 6. The control device 10 detects an edge of the medium 6 based on the shadow of the medium 6 formed on the backing surface 41 due to the light from the light source 1. The edge of the medium 6 is detected based on, for example, a difference between densities in a shadow area and an area other than the shadow (the medium 6 and the backing surface 41) in the original image data. Conventionally, in the method of detecting the edge of the medium 6 based on the shadow of the medium 6, density of the shadow varies depending to the thickness of the medium 6 (paper thickness), and the shadow of the ends (right end and left end) of the medium in the main scanning direction cannot be detected accurately, thereby making it difficult to improve detection accuracy of the medium 6. Because the shadow at the right end and the left end are hard to appear noticeably, the set position and the size of the medium 6 need to be restricted to detect the shadow at the right end and the left end.

Figure 4:
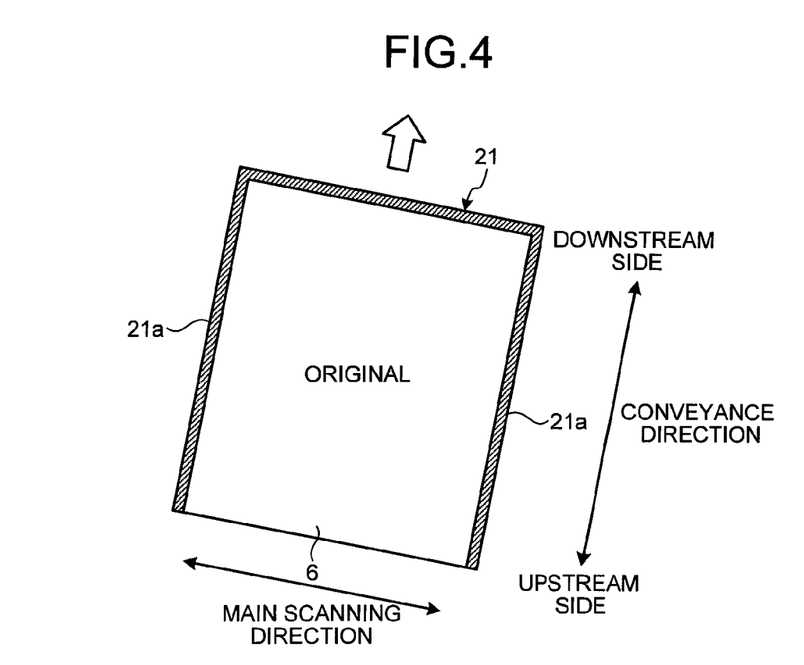
FIG. 4 depicts a shadow of a medium generated by the image reading apparatus according to the embodiment.

According to the image reading apparatus 1-1 of the present embodiment, the backing surface 41 is inclined with respect to the conveyance direction, and the gap "G" between the conveyance path 3 and the backing surface 41 decreases from the light source 1 side toward the imaging unit 2 side in the conveyance direction. Thus, because the backing surface 41 is inclined, the backing surface 41 is spaced from the conveyance path 3 at least at the read line. Accordingly, variation in the density of the shadow of the medium 6 formed on the backing surface 41 due to the thickness or the like of the medium 6 is suppressed. For example, even for a medium 6 that is thin for which a shadow thereof does not noticeably appear conventionally, the shadow of the medium 6 appears noticeably and is emphasized. FIG. 4 depicts a shadow of the medium 6 formed by the image reading apparatus 1-1 according to the present embodiment. In FIG. 4, reference numeral 21 denotes a shadow of the medium 6. The shadow 21 of the medium 6 is formed with a sufficient width around the medium 6. It is possible to suppress the variation in the density of the shadow 21 due to the thickness or the like of the medium 6, and to accurately detect the edges of the medium 6 based on the shadow 21 of the medium 6.

Because the backing surface 41 is inclined and the backing surface 41 is spaced from the conveyance path 3, not only the shadow at an end of the medium 6 in the conveyance direction is emphasized but, as indicated by reference character 21a, also a shadow sufficient for detecting the edges at ends of the medium 6 in the main scanning direction is formed on the backing surface 41. Therefore, according to the image reading apparatus 1-1 of the present embodiment, it is possible to improve detection accuracy for the edges of the medium 6. Because a prominent shadow is formed at the ends in the main scanning direction regardless of the set position or the size of the medium 6, a user is able to detect the edges of the medium 6 without being conscious of it (without limiting the set position or the size of the medium 6). Because it is possible to form the prominent shadow of the medium 6 due to the mere fact that the backing surface 41 is inclined, the minimum gap "Gmin" may be 0.

Figure 6:
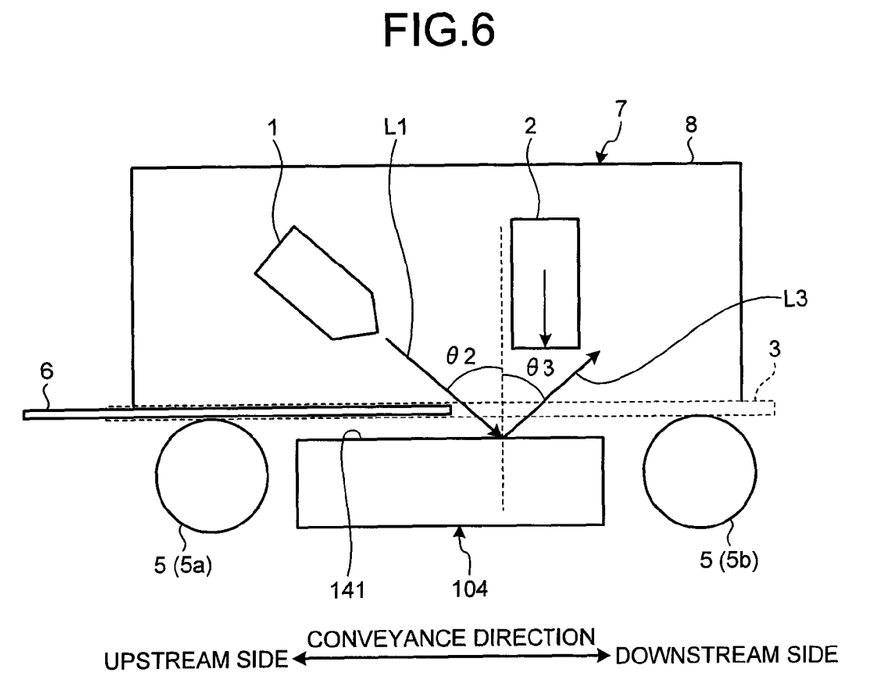
FIG. 6 depicts a backing surface parallel to a conveyance path.
Figure 7:
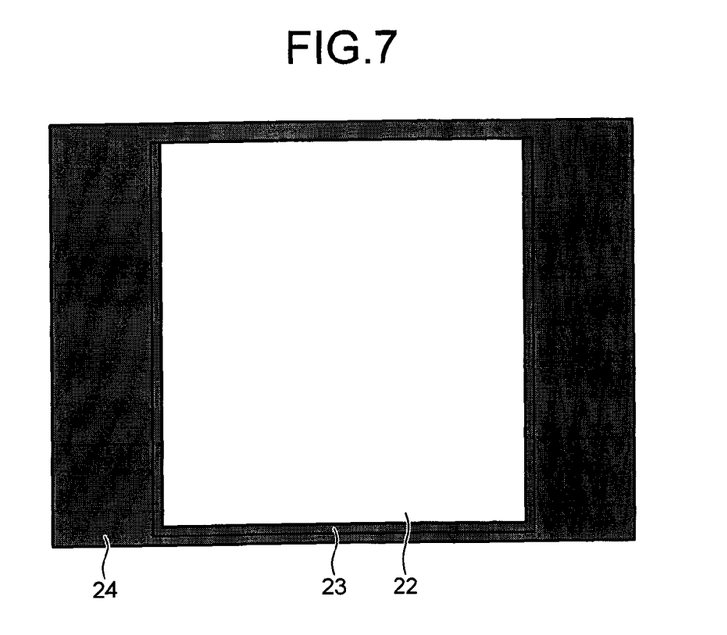
FIG. 7 depicts original image data when a backing surface is parallel to a conveyance path and spaced from the conveyance path.

There can be a problem that the shadow of the medium 6 becomes hard to see, if the backing surface 41 is merely arranged to be spaced from the medium 6, because the color of the backing surface 41 (the background color) becomes dark, as explained below with reference to FIGS. 6 and 7. FIG. 6 depicts a backing surface which is parallel to the conveyance path 3. As depicted in FIG. 6, when a backing surface 141 of a backing member 104 parallel to the conveyance path 3 is arranged spaced from the conveyance path 3, an amount of light entering the imaging unit 2, of reflected light reflected by the backing surface 141, decreases (see reference character L3). Accordingly, an image of the backing surface 141 to be picked up by the imaging unit 2 becomes dark. FIG. 7 depicts original image data when the backing surface 141 is parallel to the conveyance path 3 and spaced from the conveyance path 3. In FIG. 7, reference numeral 22 denotes an image of the medium 6, reference numeral 23 denotes an image of the shadow of the medium 6, and reference numeral 24 denotes an image of the backing surface 141 (an image of an area where the shadow is not formed). Because the backing surface 141 is dark and the density of the image 24 of the backing surface 141 is high, a difference between the densities of the image 24 of the backing surface 141 and the image 23 of the shadow of the medium 6 decreases. Accordingly, detection accuracy for the image 23 of the shadow of the medium 6 can decrease. Thus, it is difficult to generate an emphasized shadow of the medium 6 and clarify a contrast between the image 24 of the backing surface 141 and the image 23 of the shadow of the medium 6, both at the same time.

Figure 5:
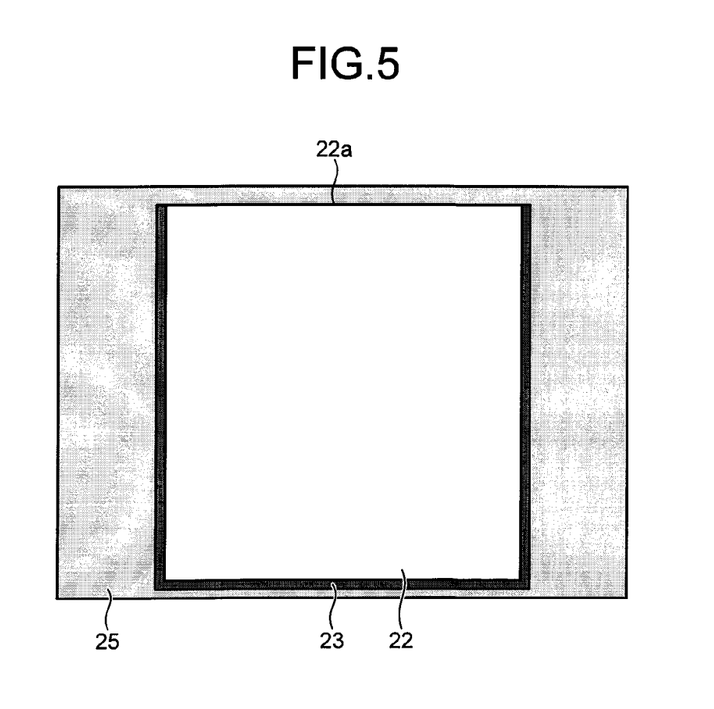
FIG. 5 depicts original image data acquired by the image reading apparatus according to the embodiment.

According to the image reading apparatus 1-1 of the present embodiment, as depicted in FIG. 1, the backing surface 41 is inclined with respect to the conveyance direction, and the gap "G" between the conveyance path 3 and the backing surface 41 decreases from the light source 1 side toward the imaging unit 2 side in the conveyance direction. Therefore, because reflected light L2 reflected by the backing surface 41 reaches the imaging unit 2 appropriately, it is possible to suppress reduction in an amount of light reaching the imaging unit 2 of the reflected light L2 reflected by the backing surface 41. FIG. 5 depicts original image data acquired by the image reading apparatus 1-1 according to the present embodiment. As depicted in FIG. 5, according to the image reading apparatus 1-1 of the present embodiment, it is possible to suppress darkening of an image (an image of an area where the shadow is not formed) 25 of the backing surface 41, and to secure a sufficient difference between densities of the image 23 of the shadow of the medium 6 and the image 25 of the backing surface 41. As a result, it is possible to improve detection accuracy for the medium 6. The density (the background color) of the image 25 of the backing surface 41 changes according to the inclination angle $\theta 1$ of the backing surface 41. That is, a reflection angle $\theta 3$ of light from the light source 1 is adjustable by the inclination angle $\theta 1$ of the backing surface 41 to obtain an expected density for the background color. Accordingly, it is possible to emphasize a difference in density between the medium 6 and the shadow and a difference in density between the backing surface 41 and the shadow. The inclination angle $\theta 1$ of the backing surface 41 may be fixed or variable.

A method of detecting the medium 6 by the image reading apparatus 1-1 is explained next. The processor 13 detects pixel data corresponding to the shadow of the medium 6 in the original image data, and detects pixel data corresponding to the edge of the medium 6 in the original image data, based on the detected pixel data corresponding to the shadow of the medium 6. The processor 13 detects pixel data of the image 23 of the shadow of the medium 6 based on for example a difference in density (tone) between the image 23 of the shadow of the medium 6 and the image 25 of the area in the backing surface 41 where the shadow is not formed. Alternatively, whether the pixel data is included in the area of the shadow of the medium 6 may be determined based on a result of comparing the tone of each pixel data of the original image data and a preset threshold. Detection of the image 23 of the shadow of the medium 6 is performed with respect to each of the edges at the both ends in the conveyance direction and edges at the both ends in the main scanning direction. When a plurality of areas of the image 23 of the shadow of the medium 6 are detected with respect to one edge, a most likely area is determined as the image 23 of the shadow of the medium 6. The most likely area as the image 23 of the shadow may be determined based on, for example, respective positions or tones of a plurality of candidate areas. When the most likely area as the image 23 of the shadow is determined based on the positions of the candidate areas, for example, a candidate positioned outermost in the conveyance direction or the main scanning direction may be selected.

The processor 13 detects the edges of the medium 6 based on the detected pixel data of the image 23 of the shadow of the medium 6. The processor 13 detects pixel data constituting the edges of the medium 6 and detects coordinate values of the detected pixel data, based on a difference in density (tone) between the image 22 of the medium 6 and the image 23 of the shadow of the medium 6 for the edge at each of the both ends in the conveyance direction (front end and rear end) and both ends in the main scanning direction (left end and right end). The processor 13 calculates a straight line corresponding to each edge based on the coordinate values of the detected pixel data constituting each edge. The processor 13 detects a size of the medium 6 based on each calculated straight line, and crops the area surrounded by the calculated straight lines as an image area of the medium 6. That is, the control device 10 crops image data of the medium 6 from image data including the medium 6 and the backing surface 41, based on the pixel data corresponding to the detected edges. The control device 10 also calculates slant of the medium 6 based on the calculated straight lines, and rotates the image to negate the slant.

Pixel data constituting the edges of the medium 6 may be detected based on a difference in density (tone) between the image 22 of the medium 6 and the image 25 of the backing surface 41. For example, for an edge 22a on the upstream side in the conveyance direction (rear end side) in the image 22 of the medium 6, pixel data constituting the edge may be detected based on a difference in density between the image 22 of the medium 6 and the image 25 of the backing surface 41. As a method of detecting edges of the medium 6, a boundary between the image 22 of the medium 6 and the image 23 of the shadow of the medium 6 (a boundary on an inner side of the image 23 of the shadow) may be indirectly detected based on a result of detecting a boundary between the image 23 of the shadow of the medium 6 and the image 25 of the backing surface 41 (a boundary on an outer side of the image 23 of the shadow) instead of or in addition to directly detecting the boundary (edges) between the image 22 of the medium 6 and the image 23 of the shadow of the medium 6.

According to the image reading apparatus 1-1 of the present embodiment, it is possible to infallibly detect an outline of the medium 6 and form an image, regardless of the ground design or size of the medium 6, and even if the medium 6 is skewed.

In the present embodiment, the backing member 4 is arranged at a position spaced from the conveyance path 3. The backing surface 41 is spaced from the conveyance path 3 by the minimum gap "Gmin" even at the downstream end in the conveyance direction, where the backing surface 41 is closest to the conveyance path 3. Accordingly, it is possible to make the shadow of the medium 6 formed on the backing surface 41 more prominent. By adjusting the angle θ1 between the conveyance direction and the backing surface 41 and the minimum gap "Gmin", it is possible to achieve generation of the emphasized shadow of the medium 6 and clarifying the contrast between the backing surface 141 and the shadow of the medium 6 in the image data both to the maximum extent at the same time.

Figure 8:
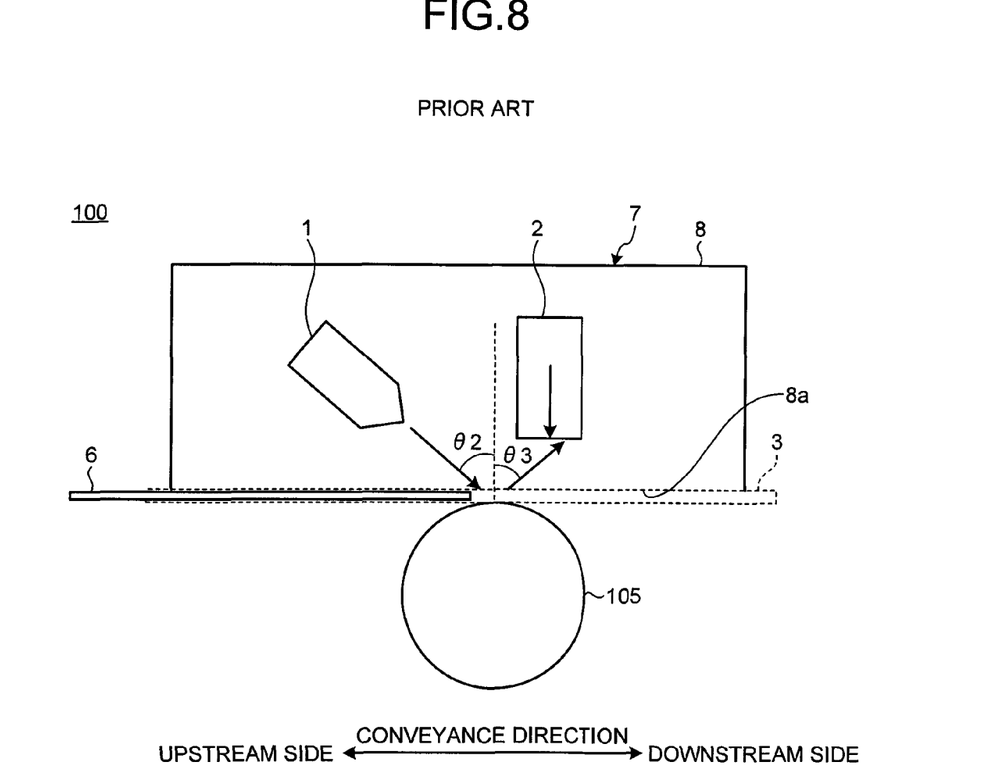
FIG. 8 is an example of a conventional image reading apparatus.

According to the image reading apparatus 1-1 of the present embodiment, the conveying roller 5 is arranged each on the upstream side and downstream side in the conveyance direction, and the upstream side conveying roller 5a and the downstream side conveying roller 5b are configured to abut against the optical unit 7, thereby enabling downsizing of a roller diameter. Conventionally, for example, as depicted in FIG. 8, in an image reading apparatus 100, a technique has been proposed in which only one conveying roller 105 is provided so that the conveying roller 105 also functions as the backing surface (background) to achieve downsizing of the apparatus. FIG. 8 is an example of a conventional image reading apparatus. In the image reading apparatus 100, one conveying roller 105 is configured to abut against the optical unit 7. According to the image reading apparatus 1-1 of the present embodiment, it is possible to decrease the roller diameter of the conveying roller 5 while ensuring the necessary conveying power, by providing a plurality (two, for example) of the conveying rollers 5.

In a configuration in which only one conveying roller 105 is provided as depicted in FIG. 8, because the position of the imaging unit 2 is fixed, the front and rear ends of the medium 6 cannot be accurately detected, and thus an end of the image of the medium 6 may be missed or the shadow of the medium 6 at the end may not be detected. However, because the image reading apparatus 1-1 according to the present embodiment includes a plurality of the conveying rollers 5, it is possible to prevent missing of the image and to infallibly detect the shadow at the end of the medium 6. Further, by having a plurality of the conveying rollers 5 and arranging the conveyance path 3 for the medium 6 along the light source 1 and the imaging unit 2, it is possible to ensure stable resolution and to suppress irregular conveyance of the medium 6.

Further, in the configuration with only one conveying roller 105, a black roller is often used because stains on a white conveying roller 105 are prominent and from the viewpoint of manufacturing. However, for a conveying roller 105 making the background color of the medium 6 black, the black color of the background appears as a show-through depending on the paper thickness of the medium 6 (in particular for a thin medium), and accurate reproduction of an image has been difficult. Further, when the conveying roller 105 having a density close to that of the medium 6 is selected, dust and stains adhered to the conveying roller 105 due to conveyance of the medium affect the image.

In contrast, according to the image reading apparatus 1-1 of the present embodiment, because a plurality of the conveying rollers 5 are provided and the backing surface 41 is independent from the conveying roller 5, it is possible to make the background color of the medium 6 closer to a reflectivity of the medium 6. Accordingly, it is possible to reproduce a true image regardless of the thickness of the medium 6 (paper thickness). Further, because the gap "G" between the medium 6 and the backing surface 41 decreases from the upstream side toward the downstream side in the conveyance direction, jamming of the medium is hard to occur, and adhesion of dust to the backing surface 41 is suppressed.

Further, it is possible to place the medium 6 closer to the light source 1 by making the conveying roller 5 abut against the transmission surface 8a of the optical unit 7 and to carry the medium 6. For example, as compared with a system in which the medium 6 is conveyed between a pair of upper and lower conveying rollers, it is possible to place the medium 6 closer to the transmission surface 8a and the light source 1. Accordingly, it is possible to suppress enlargement of the image reading apparatus 1-1 and to ensure a space for separating the backing surface 41 from the medium 6.

The control device 10 may detect the edges of the medium 6 based on a result of comparing reference data and image data including the medium 6, using the image 25 of the backing surface 41 as the reference data, instead of detecting the edges of the medium 6 based on the image 23 of the shadow of the medium 6. In this case, for example, the control device 10 reads an image so that an over-scanned area having a full width that is an image of the backing surface 41 is generated, and designates the image data of the over-scanned area as the reference data. The control device 10 then detects the edges of the medium 6 based on the comparison result between the original image data and the reference data (such as a difference in density (tone)).

Thus when the edges of the medium 6 are detected, designating the image data of the over-scanned area as the reference data, the color (density) of the backing surface 41 is preferably made variable according to the color (density) of the medium 6, by making the backing member 4 movable. For example, when the color of the medium 6 is dark, the color of the backing surface 41 is made bright (the color is lightened), and when the color of the medium 6 is light, the color of the backing surface 41 is made dark (the color is darkened). Means for making the density of the backing surface 41 variable may be a method in which the inclination angle θ1 of the backing surface 41 is made variable or a method in which the minimum gap "Gmin" is made variable. When the inclination angle θ1 is made variable, the backing member 4 is rotated, centering on a rotation shaft in the main scanning direction. When the minimum gap "Gmin" is made variable, the backing member 4 is moved in a vertical direction orthogonal to the medium 6.

According to an embodiment of the present invention, a backing surface of an image reading apparatus is inclined with respect to a conveyance direction, and a gap between a conveyance path and the backing surface decreases from a light source side to an imaging unit side in the conveyance direction. Because the backing surface is spaced from the conveyance path, a prominent shadow of a medium is formed on the backing surface. Further, because the gap between the conveyance path and the backing surface decreases from the light source side to the imaging unit side, increase in intensity of an image of the backing surface is suppressed, and a contrast between the shadow of the medium on the backing surface and an area other than the shadow is clarified. Therefore, it is possible to improve accuracy of detection of edges of a sheet-like medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus configured to read an image on a sheet-like medium conveyed on a conveyance path by an automatic conveying device, the image reading apparatus comprising:
    a light source arranged opposite to one surface of the medium;
    a background member arranged opposite to another surface of the medium, the background member including a background surface that faces the another surface of the medium;
    an imaging unit arranged opposite to the one surface of the medium and at a position different from the light source in a conveyance direction of the medium, and configured to pick up an image of the medium and the background surface on which a shadow of the medium is formed due to light from the light source; and
    an image processor configured to generate image data including the image of the medium and the background surface based on an image pick-up result by the imaging unit, wherein
    the background surface is inclined with respect to the conveyance path such that a gap between the conveyance path and the background surface decreases from a light source side toward an imaging unit side in the conveyance direction.

2. The image reading apparatus according to claim 1, wherein the background member is arranged at a position spaced from the conveyance path.

3. The image reading apparatus according to claim 1, further comprising:
    a conveying roller as the automatic conveying device; and
    a conveyance path constituting member that is arranged between the medium and the light source plus the imaging unit and opposite to the one surface of the medium, and that constitutes the conveyance path, wherein
    the conveying roller is configured to rotate with the medium between the conveyance path constituting member and the conveying roller, to convey the medium.

4. The image reading apparatus according to claim 1, further comprising:
    a detecting device that is installed on an upstream side of the imaging unit in the conveyance direction in the conveyance path and configured to detect whether the medium is present at the installed position, wherein
    an imaging range by the imaging unit in the conveyance direction is determined based on a result of the detection by the detecting device.

5. The image reading apparatus according to claim 1, further comprising an edge detector configured to detect edges of the medium in the image data, wherein
    the edge detector is configured to detect pixel data corresponding to a shadow of the medium in the image data, and to detect pixel data corresponding to the edges of the medium in the image data based on the detected pixel data corresponding to the shadow of the medium.

6. The image reading apparatus according to claim 5, wherein the edge detecting device is configured to crop image data of the medium from the image data including the medium and the background surface, based on the detected pixel data corresponding to the edges.

7. An image reading system comprising:
    the image reading apparatus according to claim 1; and
    an edge detecting device configured to detect edges of a medium in the image data, wherein
    the edge detecting device is configured to detect pixel data corresponding to a shadow of the medium in the image data, and to detect pixel data corresponding to the edges of the medium in the image data based on the detected pixel data corresponding to the shadow of the medium.

8. The image reading system according to claim 7, wherein the edge detecting device is configured to crop image data of the medium from the image data including the image of the medium and the background surface, based on the detected pixel data corresponding to the edges.

* * * * *